United States Patent
Dey et al.

(10) Patent No.: US 10,490,046 B2
(45) Date of Patent: *Nov. 26, 2019

(54) METHODS AND SYSTEMS FOR DETECTING SHOPLIFTING AT A RETAIL FACILITY

(71) Applicant: Walmart Apollo, LLC, Bentonville, AR (US)

(72) Inventors: Anindya S. Dey, Bangalore (IN); Omker Mahalanobish, Kolkata (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,766

(22) Filed: Feb. 21, 2019

(65) Prior Publication Data

US 2019/0180589 A1 Jun. 13, 2019

Related U.S. Application Data

(63) Continuation of application No. 15/873,738, filed on Jan. 17, 2018, now Pat. No. 10,255,779.

(Continued)

(30) Foreign Application Priority Data

Feb. 16, 2017 (IN) .............................. 201741005518

(51) Int. Cl.
*G08B 13/24* (2006.01)
*H04N 7/18* (2006.01)
(Continued)

(52) U.S. Cl.
CPC ..... *G08B 13/2485* (2013.01); *G08B 13/1427* (2013.01); *G08B 13/19695* (2013.01);
(Continued)

(58) Field of Classification Search
CPC ..... G06K 19/07749; G06K 2017/0041; G06K 19/0723; G06K 19/07716; H01Q 1/2225; H01Q 7/00; H01Q 1/22; H01Q 1/38
(Continued)

(56) References Cited

U.S. PATENT DOCUMENTS 7,081,818 B2    7/2006    Eckstein
8,138,922 B2 *    3/2012    Lindsay ............. G06K 19/0716
                                                                                                  340/539.26
(Continued)

FOREIGN PATENT DOCUMENTS

WO    2004034347    4/2004
WO    2013009169    1/2013

OTHER PUBLICATIONS

PCT; App. No. PCT/US2018/014144; International Search Report and Written Opinion dated May 1, 2018.

(Continued)

*Primary Examiner* — Joseph H Feild
*Assistant Examiner* — Sharmin Akhter
(74) *Attorney, Agent, or Firm* — Fitch, Even, Tabin & Flannery LLP

(57) ABSTRACT

In some embodiments, methods and systems of detecting and monitoring shoplifting of products by individuals at a retail facility include sensors coupled to a product and located at a fixed threshold distance relative to each other. The sensors are configured to generate an alert signal indicating that the fixed threshold distance between the first and second sensors has been altered. An alert sensor positioned in the product stocking area of the retail facility is configured to receive the alert signal from one or both of the product sensors. A central computing device at the retail facility is configured to determine the alert sensor that received the alert signal, and to activate a video camera in (Continued)

order to acquire a photo or video of the portion of the product stocking area of the retail facility associated with the alert sensor that received the alert signal.

8 Claims, 3 Drawing Sheets

Related U.S. Application Data

(60) Provisional application No. 62/485,099, filed on Apr. 13, 2017.

(51) Int. Cl.
*G08B 13/14* (2006.01)
*G08B 13/196* (2006.01)
*G08B 21/02* (2006.01)

(52) U.S. Cl.
CPC ....... *G08B 13/248* (2013.01); *G08B 21/0227* (2013.01); *H04N 7/188* (2013.01); *G08B 21/0236* (2013.01); *G08B 21/0277* (2013.01)

(58) Field of Classification Search
USPC ............... 340/10.1–10.6, 568.1, 568.2, 571, 340/572.1–572.9
See application file for complete search history.

(56) References Cited

U.S. PATENT DOCUMENTS

| | | |
|---|---|---|
| 9,041,537 B2 | 5/2015 | Taylor |
| 9,437,088 B2 | 9/2016 | Phillips |
| 10,255,779 B2 | 4/2019 | Dey |
| 2003/0216969 A1 | 11/2003 | Bauer |
| 2008/0246613 A1 | 10/2008 | Linstrom |
| 2009/0128334 A1 | 5/2009 | Starr |
| 2009/0212920 A1 | 8/2009 | Yang |
| 2010/0283850 A1 | 11/2010 | Li |
| 2013/0257616 A1 | 10/2013 | Taylor |
| 2014/0118145 A1 | 5/2014 | Wawrzyniak |
| 2014/0253333 A1 | 9/2014 | Patterson |
| 2015/0091729 A1* | 4/2015 | Phillips .............. G08B 13/1427 340/568.2 |
| 2015/0154847 A1 | 6/2015 | Oliver |
| 2016/0005279 A1 | 1/2016 | Salvo |
| 2016/0049056 A1* | 2/2016 | Grant ................. G08B 13/1454 340/572.1 |

OTHER PUBLICATIONS

U.S. Appl. No. 15/873,738; Notice of Allowance dated Dec. 17, 2018.

U.S. Appl. No. 15/873,738; Office Action dated Aug. 10, 2018.

* cited by examiner

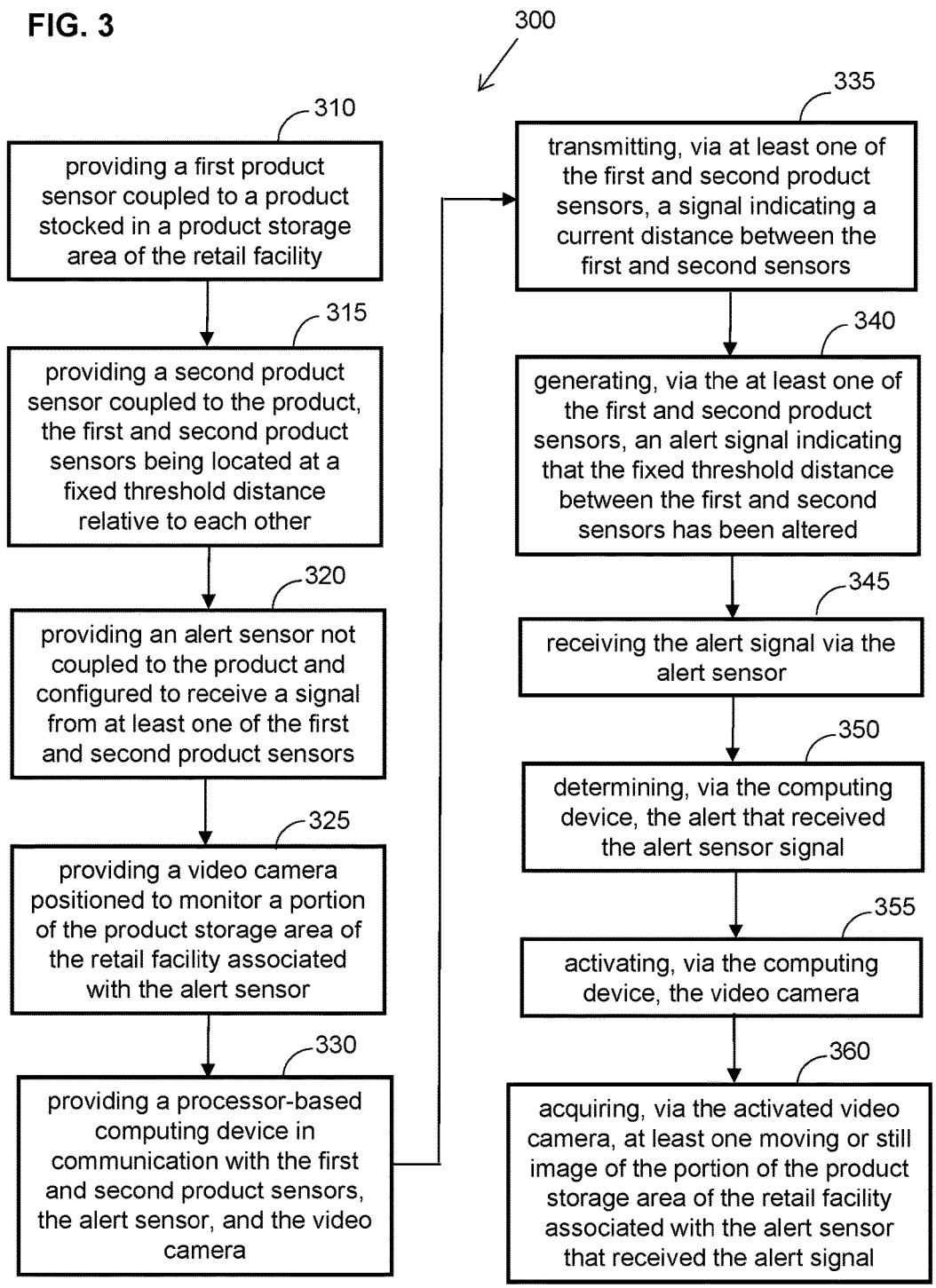

_METHODS AND SYSTEMS FOR DETECTING SHOPLIFTING AT A RETAIL FACILITY_

CROSS-REFERENCE TO RELATED APPLICATIONS

This application is a continuation of U.S. application Ser. No. 15/873,738, filed on Jan. 17, 2018, which claims the benefit of U.S. Provisional Application No. 62/485,099, filed Apr. 13, 2017, and claims priority to Indian provisional patent application no. 201741005518, filed Feb. 16, 2017, each of which are incorporated by reference herein in its entirety.

TECHNICAL FIELD

This disclosure relates generally to detecting shoplifting of products and, in particular, to systems and methods for detecting shoplifting of products via multiple sensors.

BACKGROUND

Retail facilities (e.g., department stores, product distribution centers, product sorting facilities) stock millions of products and accommodate millions of individuals (e.g., customers, vendors, workers, etc.) every day. Given the large amount of people that pass through (e.g., shop at, work at, deliver to, etc.) the retail facilities on a daily basis, and since the products stocked at the retail facilities are often small in size and have a significant monetary value, retail facilities are known to be prone to shoplifting (i.e., theft of products from the retail facility). For example, some retailers can lose about 1% of their revenue each year due to shoplifting.

In an attempt to reduce shoplifting, many retailers use sensors (e.g., Radio-Frequency identification (RFID)) that are attached to the products and set off an alarm when a person attempting to shoplift such products walks through scanners located at the exit of the retail facility with the sensors still attached to the products. However, knowing that these sensors will trigger an alarm if they are still attached to the products, some shoplifters attempt to physically remove the sensors from the products, which then renders the sensors useless, and permits such shoplifters to walk through the exit sensors with the products without triggering an alarm.

Conventional anti-shoplifting systems require manual monitoring by employees (e.g., as asset protection associates) of the retail facility, which are tasked with observing closed-circuit television (CCTV) cameras and generally monitoring the individuals (e.g., customers) at a retail facility. In addition, some asset protection associates are often positioned near the exit of the retail facility and attempt to manually observe and detect shoplifters. While asset protection associates are typically given strict instructions not to stop individuals until they are certain that the individual is actually shoplifting, a problem with such manual, largely subjective, observation of individuals may result in an innocent individual being stopped and erroneously accused of shoplifting, which is likely to embarrass and upset this individual, and may lead not only to a loss of a customer for the retailer, but also a legal action against the retailer by the upset individual.

BRIEF DESCRIPTION OF THE DRAWINGS

Disclosed herein are embodiments of systems, devices, and methods pertaining to detecting and monitoring shoplifting of products by individuals at a retail facility. This description includes drawings, wherein:

FIG. 3 is a flow diagram of a process of detecting and monitoring shoplifting of products by individuals at a retail facility in accordance with some embodiments Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
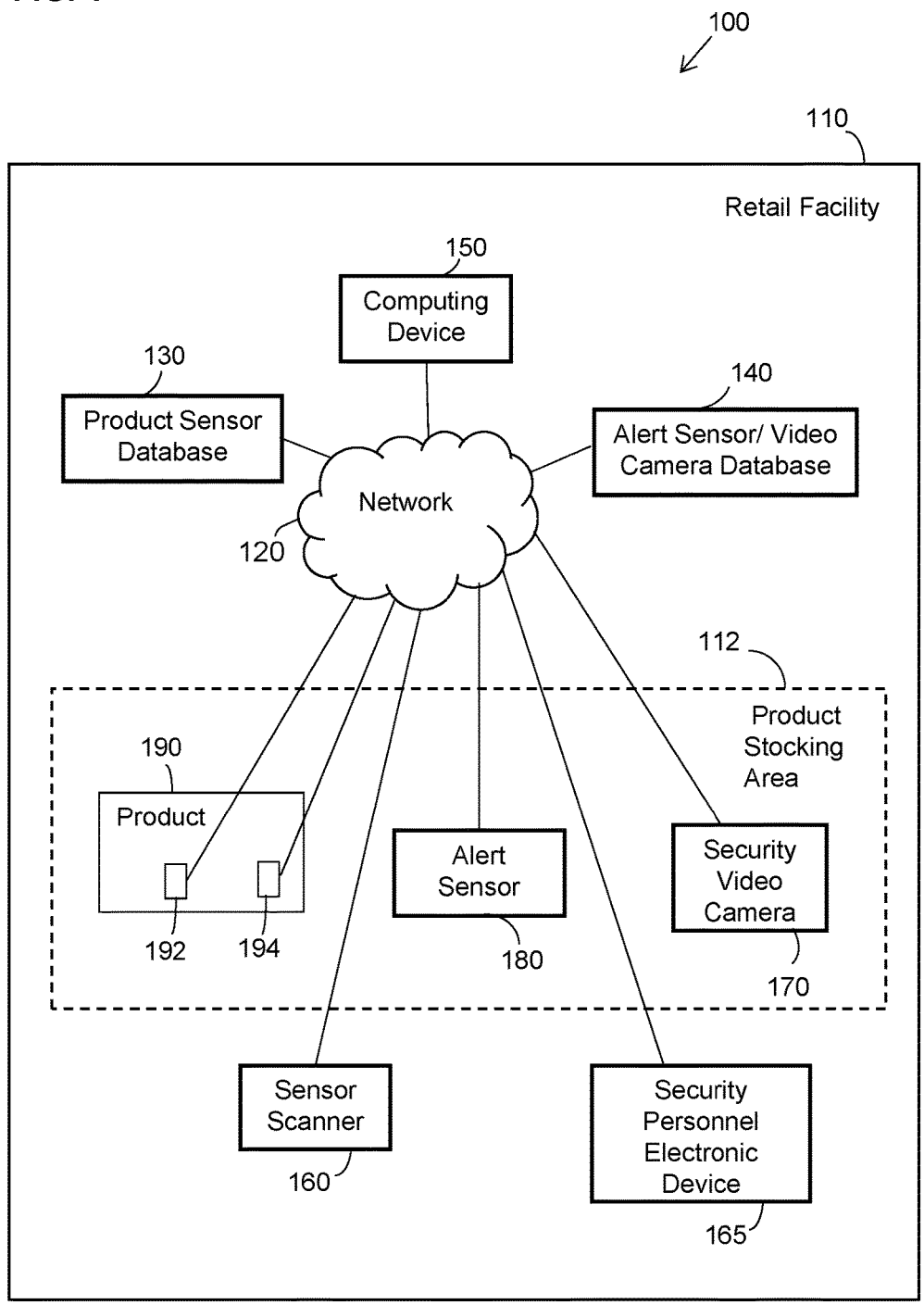
FIG. 1 is a diagram of a system of detecting and monitoring shoplifting of products by individuals at a retail facility in accordance with some embodiments.

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, this application describes systems and methods of detecting and monitoring shoplifting of products by individuals at a retail facility via multiple sensors configured to communicate with a computing device configured to activate a video camera in order to acquire digital photos and/or video footage of a portion of the product stocking area of the retail facility associated with the sensors and where the shoplifting action by the individual is taking place. The video camera then transmits such data to security personnel at the retail facility.

In one embodiment, a system for detecting and monitoring shoplifting of products by individuals at a retail facility includes a first product sensor coupled to a product stocked in a product stocking area of the retail facility, and a second product sensor coupled to the product, the first and second product sensors being located at a fixed threshold distance relative to each other. At least one of the first and second product sensors is configured to transmit a signal indicating a current distance between the first and second product sensors and generate an alert signal indicating that the fixed threshold distance between the first and second product sensors has been altered. The system further includes an alert sensor not coupled to the product and configured to receive the alert signal from at least one of the first and second product sensors, a video camera positioned to monitor a portion of the product stocking area of the retail facility associated with the alert sensor, and a processor-based computing device in communication with the first and second product sensors, the alert sensor, and the video camera. The computing device is configured to determine the alert sensor that received the alert signal and to activate the video camera, such that the activated video camera is configured to acquire at least one moving or still image of the portion of the product stocking area of the retail facility associated with the alert sensor that received the alert signal.

In another embodiment, a method for detecting and monitoring shoplifting of products by individuals at a retail facility includes: providing a first product sensor coupled to a product stocked in a product stocking area of the retail facility; providing a second product sensor coupled to the product, the first and second product sensors being located at a fixed threshold distance relative to each other; providing an alert sensor not coupled to the product and configured to receive a signal from at least one of the first and second product sensors; providing a video camera positioned to monitor a portion of the product stocking area of the retail facility associated with the alert sensor; providing a processor-based computing device in communication with the first and second product sensors, the alert sensor, and the video camera; transmitting, via at least one of the first and second product sensors, a signal indicating a current distance between the first and second product sensors; generating, via the at least one of the first and second product sensors, an alert signal indicating that the fixed threshold distance between the first and second product sensors has been altered; receiving the alert signal via the alert sensor; determining, via the computing device, the alert sensor that received the alert signal; activating, via the computing device, the video camera; and acquiring, via the activated video camera, at least one moving or still image of the portion of the product stocking area of the retail facility associated with the alert sensor that received the alert signal.

FIG. 1 shows an exemplary embodiment of a system 100 of detecting and monitoring shoplifting of products by individuals at a retail facility 110. The retail facility 110 may be any facility operated by or for a retailer, for example, a brick-and-mortar store, a product storage warehouse, a product distribution facility, a product sorting facility, or the like, where products 190 can be stocked, processed, and/or sold to consumers. In the exemplary system 100 of FIG. 1, the products 190 are stocked and/or displayed in a product stocking area 112 of the retail facility 110.

The products 190 of the exemplary system 100 include two sensors coupled thereto, namely, a first product sensor 192, and a second product sensor 194. It will be appreciated that in some embodiments, more than two (e.g., 3, 4, 5, 6, or more) such product sensors can be coupled to the product 190. The sensors 192, 194 may be coupled to the product 190 via any suitable means, including but not limited to an adhesive, a mechanical fastener, or the like. In some aspects, the first product sensor 192 and the second product sensor 194 continuously communicate to each other in order to achieve real-time monitoring of their physical locations relative to each other. For example, the first sensor 192 and the second sensor 194 can communicate to each other via a radio signal such as RFID, a Bluetooth connection, or any other wireless network. In one aspect, each of the first and second product sensors 192, 194 at the retail facility 110 is associated with a unique identifier (e.g., serial number), which is stored in a database (e.g., product sensor database 130), and can be retrieved by the computing device 150 to enable identification of the sensors 192, 194, as will be described in more detail below.

In the exemplary embodiment illustrated in FIG. 1, the components of the system 100 communicate with one another via a network 120. The network 120 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, radio frequency-based, cellular, Wi-Fi, or Bluetooth networked components, or the like. In some embodiments, one or more electronic devices of system 100 may include cloud-based features, such as cloud-based memory storage.

In one aspect, the first product sensor 192 and the second product sensor 194 of system 100 depicted in FIG. 1 are located at a fixed threshold distance relative to each other. In some aspects, the fixed threshold distance between the first product sensor 192 and the second product sensor 194 can be selected based on the physical size of the product 190 to which the first and second product sensors 192, 194 are coupled. The fixed threshold distance between the first and second product sensors 192, 194 enables the system to detect shoplifting attempts by individuals aimed at removing and/or physically manipulating, tweaking, and/or damaging the first product sensor 192 and/or the second product sensor 194. In other words, the system 100 is configured such that changes in the fixed threshold distance between the first and second product sensors 192, 194 are detected by the system 100, and result in an generation of an alert signal.

In some embodiments, each of the first and second product sensors 192, 194 is configured to generate and continuously transmit (e.g., via the network 120 to the computing device 150) a signal indicating a current distance between the first and second product sensors 192, 194. In addition, in some configurations, in response to receiving a control signal (instructing the first and second sensors 192, 194 to generate an alert signal) from the computing device 150, each of the first and second product sensors 192, 194 is configured to generate and transmit an alert signal indicating that the fixed threshold distance between the first and second product sensors 192, 194 has been altered (e.g., by a person removing one or both of the first and second product sensors 192, 194) from the product 190. In one aspect, as will be described in more detail below, this alert signal is captured by one or more alert sensors 180 positioned throughout the retail facility 110, and the alert sensors 180, in response to receipt of an alert signal from one of the first and second product sensors 192, 194, are configured to transmit (e.g., to a computing device 150 over the network 120) a notification signal indicating that the alert signal was received by the alert sensor 180 from one or both of the first and second product sensors 192, 194.

The exemplary system 100 of FIG. 1 further includes an alert sensor 180 not coupled to the product 190 and configured to receive (via the network 120) the alert signal from the first product sensor 192 and/or the second product sensor 194. The alert sensor 180 is associated with a portion of the product stocking area 112 of the retail facility 110. In one aspect, the retail facility 110 is a retail store, and an alert sensor 180 is located at each of the aisles on the sales floor of the retail store. In some embodiments, the system 100 includes alert sensors (e.g., 2-10, 2-20, 2-30, 2-40, 2-50, or more than 50) positioned such that at least one alert sensor 180 is located at each portion (e.g., at each aisle) of the product stocking area 112 of the retail facility 110. In one aspect, each alert sensor 180 at the retail facility 110 is associated with a unique identifier (e.g., serial number), which is stored in a database, and can be retrieved by the computing device 150 to enable identification of the alert sensor 180, as will be described below.

The system 100 of FIG. 1 further includes a video camera 170 positioned to monitor a portion of the product stocking area 112 of the retail facility 110 associated with the alert sensor 180. In some embodiments, the video camera 170, when activated, is positioned such that it acquires one or more moving image (e.g., video) and/or still image (e.g., photograph) of the portion of the product stocking area 112 of the retail facility 110 associated with the alert sensor 180 that received the alert signal. For example, in one aspect, the video camera 170, when activated, is configured to transmit such moving and/or still images of the portion of the product stocking area 112 of the retail facility 110 associated with the alert sensor 180 that received an alert signal to a computing device 150 of the system 100, as will be described in more detail below.

In some embodiments, the system 100 further includes at least one sensor scanner 160 proximate an exit from the retail facility 110. Such a sensor scanner 160 is configured to detect whether a product 190 being removed from the retail facility 110 by an individual (e.g., a customer) is still coupled to one or more of the first and second product sensors 192, 194. In one aspect, the sensor scanner 160 generates an alert (e.g., audible siren) when the product 190 being removed from the retail facility 110 by the individual includes either only the first product sensor 192, or only the second product sensor 194, or both the first and second product sensors 192, 194.

The system 100 of FIG. 1 includes an electronic device 165, which can be an electronic (e.g., stationary or portable) computing device that may be installed in a security office or carried by security personnel at the retail facility 110. Examples of such electronic devices 165 of security personnel may include, but are not limited to desktop computers, laptop computers, electronic tablets, cellular phones, or the like electronic computing devices capable of receiving signals from the computing device 150 and/or video camera 170 over the network 120.

In one aspect, the retail facility 110 is a store location of the retailer, and a video camera 170 is located at each of the aisles on the sales floor of the retail store. In some embodiments, the system 100 includes video cameras 170 (e.g., 2-10, 2-20, 2-30, 2-40, 2-50, or more than 50) positioned such that at least one video camera 170 is located at each portion (e.g., at each aisle) of the product stocking area 112 of the retail facility 110. In one aspect, each video camera 170 at the retail facility 110 is associated with a unique identifier (e.g., alphanumeric serial number), which is stored in a database (e.g., alert sensor/video camera database 140), and can be retrieved by the computing device 150 to uniquely identify the video camera 170.

In the embodiment of FIG. 1, the system 100 includes a product sensor database 130. In some embodiments, the product sensor database 130 is configured to store information associated with the product 190, the first product sensor 192, and the second product sensor 194. In one aspect, the product sensor database 130 is configured to store data indicating identifying information (e.g., name, serial number, barcode number, or any other unique identifier) associated with the product 190, identifying information (e.g., serial number or any other unique identifier) associated with the first product sensor 192, and identifying information (e.g., serial number or any other unique identifier) associated with the second product sensor 194. For example, the product sensor database 130, in some configurations, stores electronic data including but not limited to: name and unique serial number of each product 190 stocked at the retail facility 110, as well as the unique serial numbers associated with each of the first and second product sensors 192, 194 that are coupled to the products 190 at the retail facility 110.

In some embodiments, the product sensor database 140 further includes data indicating the fixed threshold distance between the first product sensor 192 and the second product sensor 194 coupled to the product 190. In one aspect, the product sensor database 130 further includes electronic data indicating a current distance between the first product sensor 192 and the second product sensor 194, which data is continuously transmitted by the first and second product sensors 192, 194 to the product sensor database 130 and/or computing device 150. As will be discussed in more detail below, the fixed threshold distance data stored in the product sensor database 130 and the current distance data transmitted by the first and second product sensors 192, 194 are analyzed by the computing device 150 of system 100 in order to detect a shoplifting attempt by an individual involving tampering with the first and second product sensors 192, 194.

The system 100 of FIG. 1 also includes an alert sensor/video camera database 140. In some embodiments, the alert sensor/video camera database 140 stores identifying information associated with the alert sensor 180, as well as identifying information associated with the security video camera 170. In one aspect, the alert sensor/video camera database 140 stores data indicating identifying information (e.g., serial number) associated with each alert sensor 180 located at the retail facility 110, the location of each alert sensor 180 at the retail facility 110, the identifying information (e.g., serial number) associated with each video camera 170 located at the retail facility 110, as well as the location of each video camera 170 at the retail facility 110.

In some embodiments, one or both of the product sensor database 130 and alert sensor/video camera database 140 can be stored, for example, on non-volatile storage media (e.g., a hard drive, flash drive, or removable optical disk) internal or external to the computing device 150 of FIG. 1 (which will be described in more detail below), or internal or external to computing devices separate and distinct from the computing device 150. It will be appreciated that one or both of the product sensor database 130 and alert sensor and video camera database 140 may be cloud-based. While the product sensor database 130 and the alert sensor/video camera database 140 are illustrated in FIG. 1 as two separate electronic databases, it will be appreciated that the system 100 may be configured such that the product sensor database 130 and alert sensor/video camera database 140 are incorporated into a single electronic database, or are embodied as three separate databases.

The exemplary system 100 depicted in FIG. 1 includes a computing device 150 configured generally to manage the inventory of products 190 and store security data at the retail facility 110, and more specifically, to manage and analyze data associated with the products 190, first and second product sensors 192, 194, and alert sensor 180 (e.g., determine the alert sensor 180 that received an alert signal from the first and second product sensors 192, 194), as well as the video camera 170 (e.g., activate the video camera 170 and cause transmission of videos/photos acquired by the video camera 170 to the electronic device 165 of security personnel), as will be further discussed below. The computing device 150 of FIG. 1 may be a stationary or portable electronic device including a processor-based control circuit, for example, a desktop computer, a laptop computer, a tablet, a mobile phone, or any other electronic device configured for data entry and one-way and/or two-way communication (e.g., via network 120) with another device (e.g., first and second product sensors 192, 194, alert sensor 180, video camera 170, and/or security electronic device 165, and/or sensor scanner 160) located at the retail facility 110, or at a location remote to the retail facility 110 (e.g., a regional server configured for two-way communication with the computing device 150 at several retail facilities 110).

Figure 2:
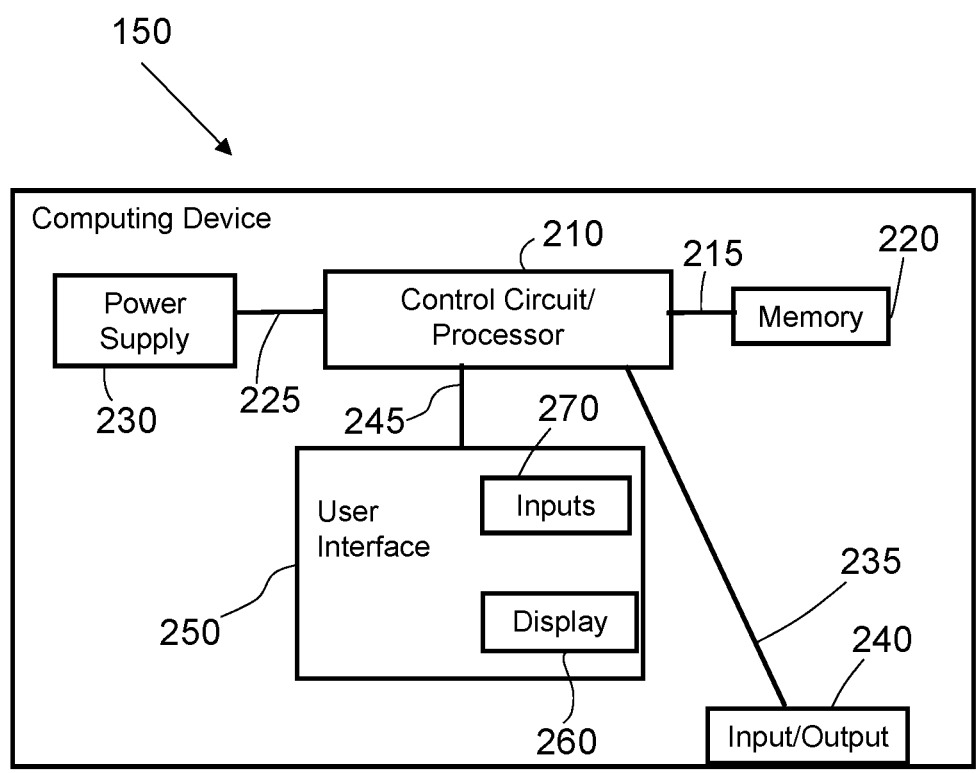
FIG. 2 is a functional block diagram of a computing device in accordance with some embodiments.

With reference to FIG. 2, an exemplary computing device 150 configured for use with exemplary systems and methods described herein may include a control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 210 of the computing device 150 is also electrically coupled via a connection 235 to an input/output 240 that can receive signals from the first and second product sensors 192, 194 (e.g., data indicating a current distance between the first and second product sensors 192, 194), alert sensor 180 (e.g., receiving an alert signal from the alert sensor 180), product sensor database 130 (e.g., data indicating a fixed threshold distance between the first and second product sensors 192, 194), alert sensor/video camera database 140 (e.g., data indicating an identity of the alert sensor 180 that received an alert signal from the first and second product sensors 192, 194), or from any other source (e.g., sensor scanner 160, etc.) configured to communicate with the computing device 150 via a wired or wireless connection (e.g., network 120). The input/output 240 of the computing device 150 can also send signals over the network 120, for example, to the first and second product sensors 192, 194 (e.g., control signal instructing the first and second product sensors 192, 194 to send out an alert signal), to the video camera 170 (e.g., to activate the video camera 170), to the electronic device 165 (e.g., to notify security personnel of an ongoing shoplifting event), or to any other electronic device in wired or wireless communication with the computing device 150.

In the embodiment shown in FIG. 2, the processor-based control circuit 210 of the computing device 150 is electrically coupled via a connection 245 to a user interface 250, which may include a visual display or display screen 260 (e.g., light-emitting diode (LED) screen) and/or button input 270 that provide the user interface 250 with the ability to permit an operator of the computing device 150 to manually control the computing device 150 by inputting commands via touch-screen and/or button operation and/or voice commands to, for example, to activate a selected video camera 170 at the retail facility 110, and/or to select an electronic device 165 of security personnel to which to send the photo/video data obtained by the video camera 170. It will be appreciated that the performance of such functions by the processor-based control circuit 210 of the computing device 150 is not dependent on a human operator, and that the control circuit 210 may be programmed to perform such functions without a human operator.

In some embodiments, the display screen 260 of computing device 150 is configured to display various graphical interface-based menus, options, and/or alerts that may be transmitted to the computing device 150 and displayed on the display screen 260 in connection with various aspects of monitoring and detecting shoplifting at the retail facility 110. The inputs 270 of the computing device 150 may be configured to permit an operator to navigate through the on-screen menus on the computing device 150 and select which video camera 170 to activate in order to record and/or photograph movements/activity of an individual suspected of shoplifting. It will be appreciated that the display screen 260 may be configured as both a display screen and an input 270 (e.g., a touch-screen that permits an operator to press on the display screen 260 to enter text and/or execute commands.)

As mentioned above, in some embodiments, the first and second product sensors 192, 194 continuously transmit electronic data indicating a current distance between the first and second product sensors 192, 194. In one aspect, such data can be transmitted to the product sensor database 130 for storage. In some aspects, the control circuit 210 of the computing device 150 is programmed to obtain such data from the product sensor database 130 via the network 120 and to detect, based on the data indicating the current distance between the first and second sensors 192, 194 (transmitted by the first and/or second product sensor 192, 194 and stored in the product sensor database 130), that the fixed threshold distance between the first and second product sensors 192, 194 on the product 190 has been altered. In addition, as will be described in more detail below, the control circuit 210 of the computing device 150 is programmed, after detecting that the fixed threshold distance between the first and second product sensors 192, 194 on the product 190 has been altered, to send a control signal to one or both of the first and second product sensors 192, 194 in order to cause one or both of the first and second product sensors 192 to generate an alert signal and to transmit the generated alert signal to the alert sensor 180.

In some aspects, the control circuit 210 of the computing device 150 is programmed to generate a time stamp indicating a time when such a control signal is sent by the computing device 150 to one or both of the first and second product sensors 192, 194. In other aspects, control circuit 210 of the computing device 150 is programmed to generate a time stamp indicating a time when a notification signal indicating that the alert sensor 180 received an alert signal from the first product sensor 192 and/or second product sensor 194 is received by the computing device 150 from the alert sensor 180. In some embodiments, the control circuit 210 of the computing device 150 is programmed to analyze the data indicating the time stamp when the control signal is sent by the computing device 150, and the data indicating the time stamp when the notification signal is received by the computing device 150 from the alert sensor 180 in order to determine which of the alert sensors 180 was the first to receive the alert signal from the first product sensor 192 and/or second product sensor 194.

The control circuit 210 of the computing device 150 is configured, in some aspects, to transmit one or more moving or still digital images of the portion of the product stocking area 112 of the retail facility 110 associated with the alert sensor 180 that received the alert signal to the alert sensor/video camera database 140 for storage and future retrieval/reference. In some aspects, the control circuit 210 of the computing device 150 is configured to transmit, to the electronic device 165 of a security worker at the retail facility 110, one or more moving/still images of the portion of the product stocking area 112 of the retail facility 110 associated with the alert sensor 180 that received the alert signal. In some aspects, the control circuit 210 of the computing device 150 is programmed to generate and transmit a notification (e.g., electronic alert) after the shoplifting alert signal is received by the computing device 150 from the alert sensor 180.

For example, the computing device 150 can transmit a signal over the network 120 to an electronic device 165 of security personnel at the retail facility 110 to inform the security personnel that a shoplifting even has been detected at a portion of the product stocking area 112 of the retail facility 110. In some aspects, such a signal can include electronic data including at least one image/video of the individual suspected of shoplifting that was acquired by the video camera 170. In some embodiments, the electronic notifications sent by the computing device 150 over the network 120 include, but are not limited to, short message service (SMS) messages, electronic mail (e-mail) messages, instant messenger messages, and/or push notifications.

With reference to FIGS. 1-3, one method 300 of operation of the system 100 for detecting and monitoring shoplifting of products 190 by individuals at a retail facility 110 will now be described. For exemplary purposes, the method 300 is described in the context of the system of FIG. 1, but it is understood that embodiments of the method 300 may be implemented in the system 100 or other systems.

As shown in FIG. 3, the method 300 includes providing a first product sensor 192 physically coupled to a product 190 stocked in a product stocking area 112 of the retail facility 110 (step 310) and providing a second product sensor 194 coupled to the product 190 and located at a fixed threshold distance relative to the first product sensor 194 (step 315). The method 300 of FIG. 3 further includes providing an alert sensor 180 not physically coupled to the product 190 and configured to receive a signal from one or both of the first and second product sensors 192, 194 (step 320) and providing a video camera 170 positioned to monitor a portion of the product stocking area 112 of the retail facility 110 associated with the alert sensor (step 325).

In some embodiments, the method 300 includes providing a product sensor database 130, which stores electronic data including but not limited to: data (e.g., name and/or serial number) uniquely identifying each product 190 having first and second product sensors 192, 194 coupled thereto; data (e.g., serial number) uniquely identifying the first product sensor 192; data (e.g., serial number) uniquely identifying the second product sensor 194; a fixed threshold distance (e.g., 0.05 cm, 0.1 cm, 0.5 cm, 1 cm, 5 cm, 10 cm, etc.) between the first and second product sensors 192, 194 on each product at the retail facility 110; and a current distance (e.g., 0.05 cm, 0.1 cm, 0.5 cm, 1 cm, 5 cm, 10 cm, etc.) between the first and second product sensors 192, 194 on each product at the retail facility 110.

In some embodiments, the method 300 includes providing an alert sensor and video camera database 140, which stores electronic data including but not limited to: data (e.g., serial number) uniquely identifying each alert sensor 180 located in the product stocking area 112 (or any other area suitable for monitoring) of the retail facility 110; data (e.g., location description and/or global positioning system (GPS) coordinates) indicating physical location of each alert sensor 180 at the retail facility 110; data (e.g., serial number) uniquely identifying one or more video cameras 170 located at a portion of the product stocking area 112 associated with the alert sensor 180. As mentioned above, the product sensor database 130 and alert sensor/video camera database 140, instead of being two separate databases, may be implemented as one database.

The exemplary method 3 of FIG. 3 further includes providing a processor-based computing device 150 in communication with the first product sensor 192, second product sensor 194, alert sensor 180, and video camera 170 (step 330). In some aspects, the computing device 150 receives data in real-time from the first and second product sensors 192, 194 and/or the alert sensor 180. In other aspects, the computing device 150 accesses the product sensor database 130 and/or the alert sensor and video camera database 140 to obtain data that enables the computing device 150 to determine, for example, which alert sensor 180 sent a notification signal indicating that the alert sensor 180 received an alert signal from one or both of the first and second product sensors 192, 194, and which video camera 170 to activate in order to record a shoplifting event in progress in the product stocking area 112 of the retail facility 110. In other words, the computing device 150 is configured for real-time monitoring of data indicating preset threshold distances between the first and second product sensors 192, 194 on products 190 at the retail facility 110, current distances between the first and second product sensors 192, 194, locations (and signals transmitted by) of alert sensors 180, and locations (and operational status) of video cameras 170.

In the embodiment illustrated in FIG. 3, the method 300 includes transmitting, via one or both of the first and second product sensors 192, 194 on the product 190, a signal indicating a current distance between the first product sensor 192 and the second product sensor 194 (step 335). As discussed above, the first product sensor 192 and second product sensor 194 continuously communicate to each other in order to generate real-time data indicating their current physical locations/distance relative to each other. Such data is transmitted by the first and second product sensors 192, 194 to the product sensor database 130 for storage and retrieval and/or analysis by the computing device 150. It will be appreciated, however, that in some aspects, such data can be transmitted by the first and second product sensors 192, 194 directly to the computing device 150.

In some embodiments, the computing device 150 accesses the product sensor database 130 over the network 120 to determine if the fixed threshold distance stored in the product sensor database 130 in association with the first and second product sensors 192, 194 corresponds to the current distance between the first and second sensors 192, 194, which is transmitted to the product sensor database 130 by the first and second product sensors 192, 194 in real-time as discussed above. As such, the computing device 150 can detect a change in the distance between the first and second product sensors 192, 194 coupled to the product 190. Such change is highly indicative of a shoplifting attempt, where an individual attempts to physically manipulate or remove one or both of the first and second product sensors 192, 194 in order to carry the product 190 out of the retail facility 110 past the sensor scanner 160 located at the retail facility 110 exit.

In some embodiments, after the computing device 150 detects that the distance between the first and second product sensors 192, 194 has changed relative to the fixed threshold distance stored in the product sensor database 130 in association with the first and second product sensors 192, 194, the computing device 150 sends a control signal to one or both of the first and second product sensors 192, 194 in order to cause one or both of the first and second product sensors 192, 194 to generate an alert signal. In one aspect, the computing device 150 generates a time stamp indicating a time when this control signal is sent by the computing device 150 to one or both of the first and second product sensors 192, 194. In some aspects, the control signal sent by the computing device 150 to one or both of the first and second product sensors 192, 194 causes one or both of the first and second product sensors 192, 194 to transmit an alert signal configured to be captured by an alert sensor 180. The alert signal transmitted from one or both of the first and second product sensors 192, 194 is then received by one or more of the alert sensors 180 at the retail facility 110 (e.g., located in the product stocking area 112). To that end, the method 300 of FIG. 3 includes generating, via one or both of the first and second product sensors 192, 194, an alert signal indicating that the fixed threshold distance between the first and second sensors has been altered (step 340), and receiving the alert signal via the alert sensor (step 345).

In some embodiments, after one or more alert sensors 180 at the retail facility 110 receive the alert signal transmitted by one or more of the first and second product sensors 192, 194 associated with the product 190, the alert sensor 180 transmits, to the computing device 150 over the network 120, a notification signal indicating that the alert signal was received by the alert sensor 180 from one or both of the first and second product sensors 192, 194. In some aspects, this signal from the alert sensor 180 includes the unique identifier (e.g., serial number) of the alert sensor 180, thus enabling the computing device 150 to determine the identity and thus the physical location of the alert sensor at the retail facility 110.

In one aspect, after receiving the notification signal from the alert sensor 180, the computing device 150 generates and registers (e.g., in the alert sensor and video camera database 140) a time stamp indicating a time when the notification signal is received by the computing device 150 from the alert sensor 180. To that end, the method 300 of FIG. 3 includes determining, via the computing device 150, the alert sensor 180 that received the alert signal from one or both of the first and second product sensors 192, 194 (step 350). In some aspects, after the computing device 150 registers the time stamp indicating a time when the notification signal is received by the computing device 150 from the alert sensor 180, the computing device 150 queries the alert sensor/video camera database 140 to obtain: (1) data indicating the time stamp when the computing device 150 sent the control signal to one or both of the first and second product sensors 192, 194; and (2) data indicating the time stamp when the notification signal is received by the computing device 150 from the alert sensor 180. An analysis of such data enables the control circuit 210 of the computing device 150 to determine which alert sensor 180 was the first to receive the alert signal from one or both of the first and second product sensors 192, 194.

In other words, if the alert signal transmitted by one of the first and second product sensors 192, 194 is received by two alert sensors 180 and in turn relayed in notification signals by both alert sensors 180 to the alert sensor/video camera database 140 and/or computing device 150, the computing device 150 can determine which of the two alert sensors 180 is physically closer to the location of the product sensor (i.e., 192 or 194 that transmitted the alert signal). For example, if the computing device 150 determines: (1) that the difference between the two time stamps (i.e., the time for the computing device 150 to receive the notification signal from a first alert sensor 180 after the computing device 150 sends the control signal to the first and second product sensors 192, 194) is 1.05 seconds; and (2) that the difference between the two time stamps (i.e., the time for the computing device 150 to receive the notification signal from a second alert sensor 180 after sending a control signal to the first and second product sensors 192, 194) is 1.12 seconds, the control circuit 210 of the computing device 150 is programmed to determine that the first alert sensor 180 is physically closer than the second alert sensor 180 to the first and second product sensors 192, 194 that sent out the alert signal.

Given that the alert sensor and video camera database 140 stores data indicating the unique identifiers and locations of all alert sensors 180 and all video cameras 170 at the retail facility 110, in some embodiments, the control circuit 210 of the computing device is programmed to determine which video camera 170 is physically closest to the alert sensor 180 that was determined to be closest to the first and second product sensors 192, 194 that sent out the alert signal. After the computing device 150 determines which video camera 170 is closest to the alert sensor 180 closest to the first and second product sensors 192, 194 that sent out the alert signal, the method 300 of FIG. 3 includes activating, via the computing device 150, the video camera 170 (step 355), and acquiring, via the activated video camera 170, at least one moving or still image of the portion of the product stocking area 112 (e.g., an aisle) of the retail facility 110 (e.g., retail store) associated with the alert sensor 180 that received the alert signal (step 360).

The video camera 170, after being activated, acquires a video and/or takes digital photographs of this portion of the product stocking area 112, which captures data indicating clear video/photo evidence of an individual engaging in a shoplifting activity (e.g., ripping off one or both of the first and second product sensors 192, 194) in this portion of the product stocking area 112 of the retail facility 110. In some aspects, the video/photo data captured by the video camera 170 is transmitted by the video camera 170 over the network 120 to the alert sensor/video camera database 140 for storage and retrieval (e.g., by the computing device 150). In some aspects, the video/photographic data captured by the video camera 170 is transmitted by the video camera 170 over the network 120 directly to the computing device 150, and the computing device 150 in turn transmits this data over the network 120 to an electronic device 165 of store security personnel.

Armed with video/photographic data on their electronic device 165 clearly showing the individual who engaged in the shoplifting activity associated with manipulation or removal of the first and second product sensors 192, 194 on the product 190, store security personnel can approach this individual with confidence that even if this individual disputes the fact that he/she attempted to shoplift this product 190, the store security personnel can immediately present video and/or photographic evidence of this individual illegally removing one or both of the first and second product sensors 192, 194 from the product 190, and then apprehend the individual. As such, the video/photographic evidence generated by the system 100 and method 300 enables store security personnel to rely on clear video/photographic evidence depicting the shoplifter in action instead of having to subjectively guess which individual at the retail facility 110 is shoplifting.

Notably, while the method 300 is described in conjunction with an individual removing and/or otherwise physically manipulating the first and second product sensor 192, 194 on the product 190, it will be appreciated that method 300 can also include providing at least one scanner (e.g., above-referenced sensor scanner 160) configured to detect the presence of the first and second product sensors 192, 194 proximate an exit from the retail facility 110 and detecting, via the sensor, whether a product 190 being removed from the retail facility 11 by an individual includes the first and second product sensors 192, 194. In other words, if an individual does not attempt to remove the first and second product sensors 192, 194 from the product 190 and attempts to simply carry this product 190 out of the retail facility 110 through the exit where the sensor scanner 160 is installed, the sensor scanner 160 will generate an alert (e.g., audible siren or silent signal to security personnel), which will enable security personnel to apprehend this individual.

The systems and methods described herein effectively and automatically detect shoplifting by individuals at facilities where products are stocked and/or displayed, and generate an alert and clear video/photographic evidence depicting the areas of the facilities where the shoplifting events (e.g., removal of one or both of the product sensors from the product) were detected. This video/photographic evidence is automatically transmitted to electronic devices of security personnel, thereby enabling the security personnel to not only clearly identify the individual engaged in shoplifting, but to confront this individual with clear evidence of his/her shoplifting. As a result, the systems and methods described herein may significantly decrease shoplifting at retail facilities, and thereby significantly increase profit margins of retailers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for detecting and monitoring shoplifting of products by individuals at a retail facility, the system comprising:

a first product sensor attached to a product stocked in a product stocking area of the retail facility;

a second product sensor attached to the product, the first and second product sensors being located at a fixed threshold distance relative to each other, wherein at least one of the first and second product sensors is configured to:

transmit a signal indicating a current distance between the first and second product sensors; and generate an alert signal indicating that the fixed threshold distance between the first and second product sensors has been altered.

2. The system of claim 1, further comprising an electronic database configured to store:

data indicating identifying information associated with the product, the first product sensor, and the second product sensor;

data indicating the fixed threshold distance between the first and second product sensors; and data indicating a current distance between the first and second product sensors.

3. The system of claim 1, further comprising an electronic database configured to store identifying information associated with the first product sensor and the second product sensor.

4. The system of claim 1, further comprising at least one scanner proximate an exit from the retail facility, the scanner being configured to:

detect whether a product being removed from the retail facility by an individual includes the first and second product sensors; and generate an alert when the product being removed from the retail facility by the individual includes at least one of the first and second product sensors.

5. A method for detecting and monitoring shoplifting of products by individuals at a retail facility, the method comprising:

providing a first product sensor attached to a product stocked in a product stocking area of the retail facility;

providing a second product sensor attached to the product, the first and second product sensors being located at a fixed threshold distance relative to each other;

transmitting, via at least one of the first and second product sensors, a signal indicating a current distance between the first and second product sensors;

generating, via the at least one of the first and second product sensors, an alert signal indicating that the fixed threshold distance between the first and second product sensors has been altered.

6. The method of claim 5, further comprising providing an electronic database configured to store:

data indicating identifying information associated with the product, the first product sensor, and the second product sensor;

data indicating the fixed threshold distance between the first and second product sensors; and data indicating a current distance between the first and second product sensors.

7. The method of claim 5, further comprising providing an electronic database configured to store identifying information associated with the first product sensor and the second product sensor.

8. The method of claim 5, further comprising providing at least one scanner proximate an exit from the retail facility and detecting, via the at least one exit scanner, whether a product being removed from the retail store by an individual includes the first and second product sensors, and generating an alert when the product being removed from the retail facility by the individual includes at least one of the first and second product sensors.

* * * * *